R. H. MAYLAND.
TUBULAR BELL.
APPLICATION FILED MAY 14, 1910.
1,057,003.
Patented Mar. 25, 1913.
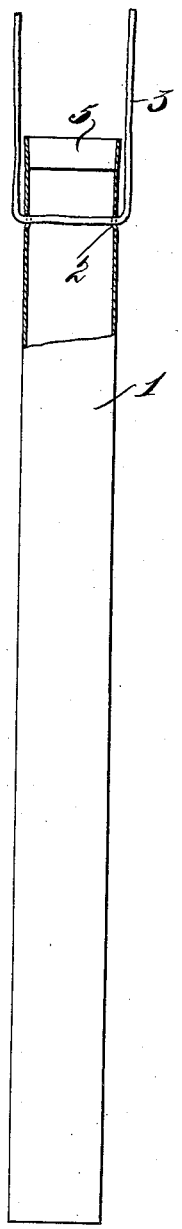
Fig. 1.
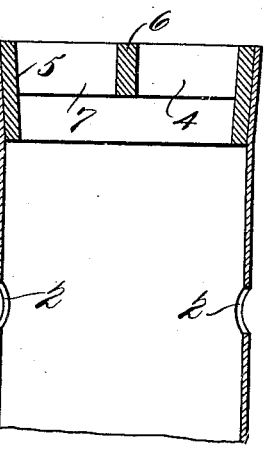
Fig. 2.
Fig. 3.
Witnesses:
C. A. Jarvis
Benjamin Rosenburg
Inventor:
Rowland H. Mayland
by G. Warren Wright
attorney.

UNITED STATES PATENT OFFICE.

ROWLAND H. MAYLAND, OF FREEPORT, NEW YORK.

TUBULAR BELL.

1,057,003.  Specification of Letters Patent.  Patented Mar. 25, 1913.

Application filed May 14, 1910. Serial No. 561,397.

*To all whom it may concern:*

Be it known that I, ROWLAND H. MAYLAND, a citizen of the United States, residing at Freeport, county of Suffolk, and State of New York, have invented certain new and useful Improvements in Tubular Bells, of which the following is a clear, full, and exact description.

This invention relates to that class of tubular bells, which consist of long tubes freely suspended and adapted to be struck by a hammer or the like, to produce a vibration of the tube to cause it to give out a musical note.

The particular object of this invention is to provide a cheap and simple tube of comparatively thin tubing, thus reducing the cost of the same without detracting from the character of tone emitted by the tube.

In carrying out this invention I provide a non-compressible plug of material thickness, and wedge the same tightly into one end of the tube. I preferably form such plug with tapered sides, so that it may be forcibly driven into place, expanding the tube where it is thus inserted, to cause the tube to be grasped in a strong vise-like grip against all liability of dislocation due to the vibration resulting from the use of the tubular bell. I prefer to form such plug not only with tapered sides, but with an open center provided with strong substantially non-compressible bridge members or webs, which I so locate in the tube with relation to its hanging cord, that a hammer when used midway between the hanging cord will strike the tube adjacent to one end of such bridges, thereby safely guarding against the setting up of a vibration which will produce overtone, and whistling, which is a source of trouble in light thin tubes.

The scope of my invention will be pointed out in the claims.

In the accompanying drawings, Figure 1 is a view partly in section of one of my improved tubular bells. Fig. 2 is a top plan thereof. Fig. 3 is an enlarged central sectional view with the taper exaggerated.

In the drawings, figure 1 represents a tube of comparatively slight thickness, provided with openings 2, through which a suspending means, such as the silken cord 3 shown, is passed. The non-compressible overtone and whistling-preventing plug 4 is provided with an annular part 5, having a tapered outer side. This plug 4 may well be a casting, and in view of its applicability for securing in place, it need not be specially machined, for as it is tapered, it is adapted to be forced into the end of the tube with substantial pressure, slightly expanding the same to produce the vise-like grip, causing the tube to conform to the inequalities of the surface of the casting. The plug 4 is preferably provided with a pair of right-angled cross bridges or ribs 6 and 7. These may not be of the same depth as the collar 5. I prefer to so place these cross ribs in the tube that there will be one at right angle and one parallel with the cord passing through the holes 2 of the tube. This places one of the ribs in the direct line for the stroke of the hammer, for to properly strike a tubular bell it should be struck so that it may freely swing on the axis of the cord.

I am aware that it has been suggested heretofore not only to load the top of the tube to prevent overtone, but that it has also been proposed to reinforce the interior of a tube of this description, and I do not claim such invention broadly.

What I do claim however, and desire to secure by United States Patent, is:

1. The herein described tubular bell of comparatively thin tubing, a tapered open plug carried by said tubing at one end thereof, a plurality of ribs extending from the wall of said plug to the center thereof, the depth of said ribs being less than the depth of said plug.

2. The herein described tubular bell of comparatively thin tubing, a tapered open plug carried by said tubing at one end thereof, a plurality of ribs extending from the wall of said plug to the center thereof, the depth of said ribs being less that the depth of said plug, said tubing being provided with openings adapted to receive a suspending element, said openings being disposed in parallelism with two of said ribs.

3. The herein described tubular bell of thin tubing, an open tapered plug of greater external diameter than the internal diameter of the tubing carried by the tubing at one end thereof, a plurality of ribs extending from the wall of said plug to the center thereof.

Signed at Brooklyn, New York, this 12th day of May, 1910.

ROWLAND H. MAYLAND.

Witnesses:
F. WARREN WRIGHT,
EDWIN S. MAYLAND.

Copies of this patent may be obtained for five cents each, by addressing the "Commissioner of Patents, Washington, D. C."